(12) United States Patent
Brandt et al.

(10) Patent No.: US 8,208,374 B2
(45) Date of Patent: Jun. 26, 2012

(54) METHOD, NETWORK AGENT AND BANDWIDTH BROKER FOR MANAGING THE AVAILABLE BANDWIDTH FOR CONNECTIONS BETWEEN TERMINALS OF A PACKET-ORIENTED COMMUNICATION NETWORK

(75) Inventors: Thomas Brandt, Neumünster (DE); Markus Messner, Biedermannsdorf (AT); Maria Schwarz, Vienna (AT); Jürgen Totzke, Poing (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 303 days.

(21) Appl. No.: 12/084,302

(22) PCT Filed: Jan. 30, 2007

(86) PCT No.: PCT/EP2007/050874
§ 371 (c)(1),
(2), (4) Date: Apr. 29, 2008

(87) PCT Pub. No.: WO2007/128595
PCT Pub. Date: Nov. 15, 2007

(65) Prior Publication Data
US 2009/0110001 A1    Apr. 30, 2009

(30) Foreign Application Priority Data
May 9, 2006    (DE) .......................... 10 2006 021 595

(51) Int. Cl.
*G01R 31/08* (2006.01)
*H04L 12/28* (2006.01)
*H04J 3/16* (2006.01)

(52) U.S. Cl. .................. 370/229; 370/230; 370/395.21; 370/395.41; 370/468

(58) Field of Classification Search .................. 370/468
See application file for complete search history.

(56) References Cited

U.S. PATENT DOCUMENTS

| | | | |
|---|---|---|---|
| 6,631,134 B1 * | 10/2003 | Zadikian et al. | 370/395.21 |
| 7,293,090 B1 * | 11/2007 | Saleh et al. | 709/226 |
| 7,397,763 B2 * | 7/2008 | Bradd | 370/230 |
| 2002/0021678 A1 * | 2/2002 | Heatwole et al. | 370/325 |
| 2003/0028641 A1 | 2/2003 | Zhang et al. | |

(Continued)

FOREIGN PATENT DOCUMENTS

DE    100 38 878 C1    1/2002

(Continued)

OTHER PUBLICATIONS

Junseok Hwant et al., "An implementation study of a dynamic inter-domain bandwidth management platform in diffserv networks", Network Operations and Management Symposium, IEEE/IFIP Seoul, Korea, Apr. 19-23, 2004, pp. 321-334, vol. 1, Chapters 3 and 4, XP010712696, ISBN: 0-7803-8230-7.

*Primary Examiner* — Brandon Renner

(57) ABSTRACT

A respective number of terminals are managed by network agents. When initializing a connection between two terminals, the network agent initializes the connection if the relevant terminals are arranged in the same bandwidth-uncritical area. If one of the terminals is arranged in a bandwidth-critical area, the network agent ascertains the requested bandwidth and sends a resource request to an associated bandwidth broker, which uses a topology function and knowledge of bandwidth used by existing connections to check the availability of the requested bandwidth in the bandwidth-critical area of the communication network. The use of network agents and the fact that resource requests are no longer required in the communication network dynamically reduces the load on bandwidth brokers and superordinate bandwidth brokers to a significant extent.

18 Claims, 1 Drawing Sheet

U.S. PATENT DOCUMENTS

| | | |
|---|---|---|
| 2003/0103510 A1 | 6/2003 | Svanberg et al. |
| 2003/0163572 A1 | 8/2003 | Hierholzer et al. |
| 2005/0114541 A1 | 5/2005 | Ghetie et al. |
| 2007/0076728 A1* | 4/2007 | Rieger et al. .................. 370/401 |

FOREIGN PATENT DOCUMENTS

| | | |
|---|---|---|
| EP | 1659729 A1 | 5/2006 |
| WO | 2005022824 A1 | 3/2005 |
| WO | 2007128595 | 11/2007 |

* cited by examiner

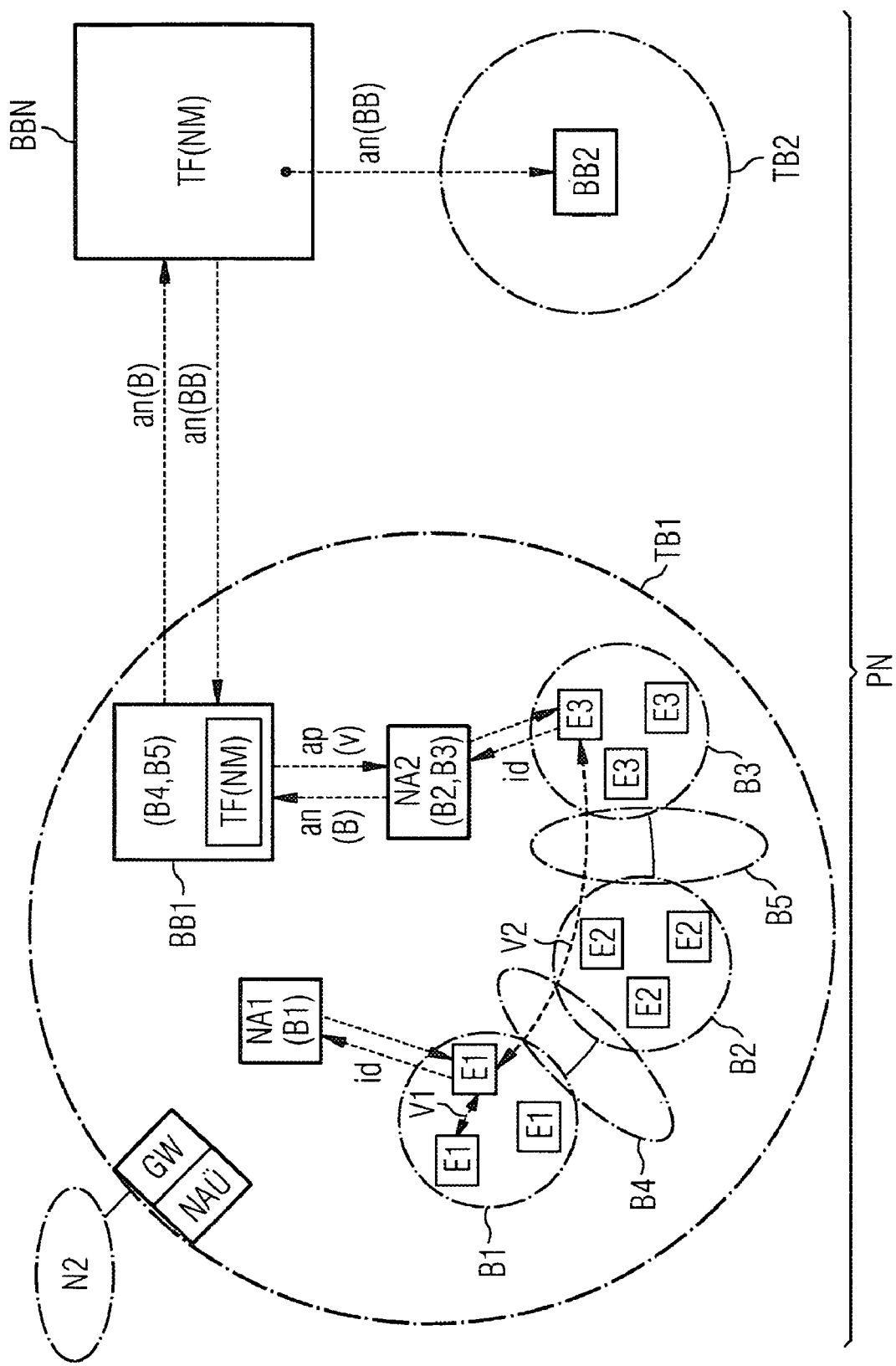

METHOD, NETWORK AGENT AND BANDWIDTH BROKER FOR MANAGING THE AVAILABLE BANDWIDTH FOR CONNECTIONS BETWEEN TERMINALS OF A PACKET-ORIENTED COMMUNICATION NETWORK

CROSS REFERENCE TO RELATED APPLICATIONS

This application is the US National Stage of International Application No. PCT/EP2007/050874, filed Jan. 30, 2007 and claims the benefit thereof. The International Application claims the benefits of German application No. 10 2006 021 595.8 DE filed May 9, 2006, both of the applications are incorporated by reference herein in their entirety.

FIELD OF INVENTION

The present invention relates to managing the available bandwidth for connections between terminals of a packet-oriented communication network.

BACKGROUND OF INVENTION

Traditional circuit-switched telephone networks and packet-switched data networks are converging to an increasing extent. One reason for this is that by combining both types of network into just one network it is possible to save on installation, maintenance and expansion costs, since the latter no longer accrue for two networks, but henceforth only for one. Another reason is that more and more voice communication takes place on a packet-switched basis already on the subscriber side ("Voice over IP": "VoIP" for short). Consequently this technology lends itself to use at network level.

Considerably less data is transferred for voice communication in packet-switched networks, which in itself is already equivalent to a substantial potential gain in efficiency. This is achieved by means of different compression methods (referred to as "codecs", standing for "coder-decoder"). The most diverse types of codecs are used for data compression. The G.711 codec operates e.g. at a sampling rate of 64 kHz, while the G.729 codec, for example, has a sampling rate of only 8 kHz.

Different protocols are also used. An example hereof is the H.323 protocol which was created by the ITU. This protocol in turn comprises various subprotocols that are used for different applications, such as e.g. H.261 for video, G.711 for audio, T.122 for data, and H.225 for signaling. An alternative to the H.323 protocol is the so-called Session Initiation Protocol (SIP).

Whereas certain applications in the network domain, e.g. Video on Demand, place no particular real-time requirements on the network, voice communication imposes high real-time requirements, since even brief delays are perceived by people as annoying during a telephone conversation.

Various approaches have been developed in order to enable high quality in particular for voice connections, all of which approaches focus on the quality of service ("QoS"). These include for example:

possible ways of reducing data congestion, or avoiding occurrences thereof from the outset ("congestion management"), handling data traffic in accordance with what are termed "service levels"; in this scheme a distinction is made between different service levels for the data traffic; different queues are set up, e.g. in routers, for the respective service levels and processed accordingly ("classification and queuing techniques"), use of identifiers for packets, which identifiers specify a particular path of the packet through the network along network nodes ("packet tagging/label switching")

provisioning of bandwidth in all domains of the network, both in bandwidth-critical as well as in non-bandwidth-critical domains of the network ("overprovisioning").

A continuous, end-to-end method for managing bandwidth across different domains, in order to guarantee the availability of a requested bandwidth for real-time-critical connections in particular, is not known in packet-oriented communication networks according to the prior art.

The TIPHON standard ("Telecommunications and Internet Protocol Harmonization over Networks") developed by ETSI ("European Telecommunications Standards Institute") has so far not succeeded in establishing itself, not least due to its complexity.

Other prior art approaches to solving the aforesaid problem provide without exception island solutions which do not work effectively with meshed network structures that are characterized e.g. by different administrative domains. A request to reserve the bandwidth must be made each time a connection is set up. In the island solutions this is always a reservation request to the network-wide bandwidth management function. As a result all requests must be carried throughout the entire network in each case. Even requests which actually require no reservation are conveyed across the entire network.

SUMMARY OF INVENTION

The object underlying the invention is to improve the assurance of sufficient bandwidth and quality of service resulting therefrom in packet-switched communication networks for real-time-critical communication data transmission. The object is achieved by means of the features recited in the independent claims.

An essential advantage of the method according to the invention is that when non-bandwidth-critical areas are assigned to network agents during an initialization of a virtual connection the requested bandwidth is indicated as available by the network agent without checking, as a result of which a considerable portion of the dynamic load is removed from the packet-oriented communication network and also from the bandwidth brokers or higher-ranking bandwidth brokers owing to the no longer necessary resource requests in the communication network. A further advantage is the good scalability of the structured method according to the invention.

According to an advantageous embodiment of the inventive method the communication network is subdivided into subdomains and each of the latter is assigned a bandwidth broker. A resource request in which the connection to be initialized is conducted beyond the assigned subdomain is routed to a higher-ranking bandwidth broker. The latter ascertains with the aid of a further topology function the subdomains included in the connection and inquires of the assigned bandwidth brokers in parallel with regard to the availability of the requested bandwidths.

As a result of the thus targeted communication the bandwidth brokers and the communication network are relieved of further dynamic load and the computing power necessary for determining the availability of the requested bandwidths in the bandwidth brokers is reduced.

Further advantageous developments of the method according to the invention may be derived from the dependent claims.

BRIEF DESCRIPTION OF THE DRAWINGS

The method according to the invention is explained in more detail below with reference to a graphical representation.

DETAILED DESCRIPTION OF INVENTION

The figure shows two subdomains TB1, TB2 of an internet-oriented packet network PN, for example an intranet in which the SIP protocol is used, but the use of a different multimedia signaling protocol, such as, say, H.323 is also possible.

For the purposes of the exemplary embodiment let it be assumed that the first subdomain TB1 has three non-bandwidth-critical areas B1 . . . B3 and that terminals E1 . . . E3 are disposed in each of the areas B1 . . . B3, the figure showing by way of example several terminals E1 in the first area B1, several terminals E2 in the second area B2, and several terminals E3 in the third area. In a non-bandwidth-critical area at least sufficient bandwidth for requestable bandwidths of the terminals E1 . . . E3 assigned to this area is available for connections. A non-bandwidth-critical area of this kind is implemented for example by means of a Gigabit Ethernet, in which very much more bandwidth is available for the assigned terminals than can be requested by the terminals for connections between the terminals.

In the first subdomain TB1 two network agents NA1 . . . NA2 are shown by way of example for the purposes of explaining the invention, wherein, by way of example, due to device-related technical and topological boundary conditions the first network agent NA1 manages the first area B1, and the second network agent NA2 manages the second and third areas B2, B3. The management function includes the knowledge of which of the terminals E1 . . . E3 are disposed in which non-bandwidth-critical area B1 . . . B3.

For the purposes of the exemplary embodiment let it be further assumed in order to explain the invention that between the first and the second area B1, B2 there lies a fourth, bandwidth-critical area B4 and between the second and third area B2, B3 there lies a fifth bandwidth-critical area B5 owing to the network topology. A bandwidth-critical area is implemented for example by means of connecting lines between the non-bandwidth-critical areas in which only a limited bandwidth is available for requested bandwidths for connections between the terminals. The bandwidth-critical areas B4, B5 are managed by a first bandwidth broker BB1 assigned to the first subdomain TB1—indicated in the figure by the label BB1(B4, B5). Managing means knowledge of the available bandwidth in these areas and in addition of the bandwidth already occupied by existing connections between terminals. The knowledge of the available bandwidth in the bandwidth-critical areas B4, B5 is acquired with the aid of a topology function TF. The topology function TF includes a network model NM which is incorporated in the first bandwidth broker BB1 and is also updated with the aid of, for example, the communication network PN. The updating can be performed at regular intervals, at irregular intervals, as needed, or, particularly advantageously, when changes are made to the configuration or network topology, in particular with regard to the bandwidth.

For the purposes of the exemplary embodiment let it be assumed in a first variant that a first connection is to be initialized between the first terminals E1 in the first non-bandwidth-critical area B13—indicated in the figure by a line labeled V1.

The network agent NA1 is advantageously implemented in a SIP proxy for example, where it tracks the signaling data traffic relating to the terminals E1 of the area B1.

In this case SIP signaling directed to the called terminal E1 is identified as real-time-critical by the assigned network agent NA1—indicated in the figure by a dashed arrow labeled id.

The network agent NA1 of the called terminal E1 then evaluates the source and destination addresses of the SIP signaling. If it is established in this process that the terminals E1 involved in the first connection V1 are situated in the first non-bandwidth-critical area B1, the SIP signaling for the connection V1 that is to be initialized is forwarded to the called terminal E1 so that the connection initialization can be continued—represented in the drawing by a dotted line. A check of the availability of the bandwidths provided for the connection V1 does not take place in this case.

According to a second variant of the exemplary embodiment let it be assumed that a second connection is to be established between a first terminal E1 in the first area B1 and a third terminal E3 in the third area B3—represented in the figure by means of a line labeled V2. Advantageously, instead of the assigned first network agent NA1 once again, the assigned second network agent NA2 of the called terminal E3 handles the information contained in the SIP signaling for the provided connection V2 and identifies the latter as real-time-critical—represented in the figure by means of an arrow labeled id. For only this second network agent NA2 knows—e.g. in the case of a call forwarding switched for the called terminal E3 or mobility of the called terminal E3—the final destination point of a connection that is to be set up.

Initially the second network agent NA2 does not forward the connection signaling to the called terminal E3. Instead it first forms a resource request packet an(B) containing the requested bandwidth B and sends it together with the specified network addresses of the two terminals E1, E3 to the assigned first bandwidth broker BB1—represented in the figure by means of a dashed arrow labeled an(B).

In the first bandwidth broker BB1 it is determined on the basis of the specified addresses of the two terminals E1, E3 with the aid of the network model NM or the topology function TF via which bandwidth-critical and non-bandwidth-critical areas B the connection V2 is to be realized in the first subdomain TB1. By this means it is determined or calculated that the connection V2 is established via the fourth and fifth bandwidth-critical areas B4, B5. Next it is checked how much bandwidth is still available in these two areas B4, B5. In this case the entire available bandwidth in the two areas B4, B5 is taken into account as well as the bandwidths that are already occupied for connections between other terminals of the communication network PN.

If the available bandwidth corresponds to the requested bandwidth for the requested connection V2, a response packet ap indicating the availability v is transmitted from the first bandwidth broker BB1 to the network agent NA2—indicated in the figure by a dashed arrow labeled ap(v). After the receipt of the response packet ap(v) the network agent NA2 then forwards the SIP signaling to the terminal E3—represented in the figure by a dotted line. Thus, the initialization of the connection V2 can be continued.

In the first bandwidth broker BB1 the bandwidth B notified as available to the first terminal E1 is now taken into account as bandwidth occupied by the connection V2 in the fourth and fifth areas B4, B5, i.e. the still available bandwidth that is available for further connections via the fourth and fifth areas B4, B5 is reduced. In the event of a new resource request this can result in a requested bandwidth B for a further connection between further terminals in the fourth and fifth bandwidth-critical areas B4, B5 no longer being available. In this case a response packet ap is formed in the first bandwidth broker BB1 and transmitted to the requesting terminal, said response packet ap indicating the non-availability nv of the requested bandwidth B. In this case a connection initialization for the affected terminal E is not allowed or, as the case may be, is not forwarded because the availability of the requested bandwidth B is not guaranteed and this leads, in particular in the case of connections for real-time-critical information such as voice, to disruptions of the voice transmission.

If a resource request an(B) for a connection to be set up of a first subdomain TB1 is transmitted to a first bandwidth broker BB1 and if an addressed destination terminal is determined which is disposed in a second subdomain TB2, the request an(B) is transmitted to a higher-ranking bandwidth broker BBN. In the latter it is determined on the basis of a network model NM comprising the two subdomains TB1, TB2 and with the aid of the specified addresses of the terminals E and a topology function TF via which subdomains TB1, TB2 the connection is transmitted. Resource requests an(BB) are then transmitted in parallel to the bandwidth brokers BB1, BB2 of the relevant subdomains TB1, TB2 with the addresses of the terminals and the requested bandwidth B—indicated in the figure by dashed arrows labeled an(BB). The availability of the requested bandwidth B is thereupon checked in the bandwidth brokers BB1, BB2, as already explained in relation to the initialization for the first and second connections V1, V2, and the result of the check is notified to the higher-ranking bandwidth broker BBN. According to the ascertained availability the assigned network agent NA is informed by way of a response packet—not shown.

The connection is initialized in the case of SIP signaling for example as part of the signaling of a virtual connection. It is advantageous in this case that—as described—the network agent NA assigned to the destination terminal directs the requests to the bandwidth brokers BB1, BB2 or to the higher-ranking bandwidth broker BBN in order to ensure the availability of the requested bandwidth, since it is ensured in this case that no call forwarding for the destination terminal E is set or that the latter is registered as a mobile terminal at some other point, and the requests would have to initiated once again.

In a third variant let it be assumed that a connection—not shown—is to be set up from a terminal E1 from the area B1 to a terminal in another network N2. Between the area B1 and the other network N2 there exists a connecting line including a network gateway device GW for interfacing the different networks PN, N2—represented in the figure by an unbroken line.

Said network N2 can be for example a traditional TDM (Time Division Multiplexing) network or another corporate network which does not support the bandwidth management via network agents and bandwidth brokers that is proposed here, the network gateway device GW being implemented as a gateway.

In order to enable terminating bandwidth management to be performed nonetheless for the network PN, at least one network gateway agent NAÜ is assigned to the network gateway device GW for these cases. Connection signaling relating not only to the network PN but also to further, other networks—such as, for example, the network N2—is conducted via said network gateway agent NAÜ.

Said network gateway agent NAÜ identifies the cross-network connection signaling of real-time-critical connections and processes this according to the principles presented above in the preceding variants of the exemplary embodiment. It therefore either enables the connection setup without further checking or formulates a resource request and transmits the latter to the bandwidth broker BB1. The special aspect is thus that bandwidth management is performed only for the area B of the connection to be set up relating to the network PN, but not for the sections of the connection that is to be set up which relate to the network N2.

The method according to the invention is not restricted to the exemplary embodiment, but can be used in all packet-oriented communication networks in which there is a requirement to check the availability of requested resources prior to a connection. This method is advantageous above all for real-time-critical connections such as voice information transmission.

The invention claimed is:

1. A method for managing available bandwidth for connections between terminals of a packet-oriented communication network comprising:
   providing a plurality of network agents, each network agent managing a plurality of terminals using knowledge of which of the managed terminals are disposed in a non-bandwidth-critical area; and
   wherein when connection signaling takes place to initialize a connection between terminals located in different non-bandwidth critical areas, an associated network agent forms a resource request requesting bandwidth, the requested bandwidth determined by the associated network agent, the resource request being directed to a bandwidth broker, the bandwidth broker checking an availability of the requested bandwidth in the communication network using knowledge of bandwidths occupied by existing connections and use of at least one topology function, the bandwidth broker transmitting a response to the resource request identifying whether the requested bandwidth is available; and
   wherein when connection signaling takes place to initialize a connection between terminals located in a same non-bandwidth critical area, an associated network agent permitting initialization of the connection to occur without checking for bandwidth availability and without contacting the bandwidth broker; and
   wherein the communication network is subdivided into subdomains, each subdomain is assigned to a respective bandwidth broker; and
   wherein the resource request for the connection to be initialized is routed from the bandwidth broker to a higher-ranking bandwidth broker that determines the subdomains included in the connection to be initialized using a further topology function and the higher bandwidth broker transmits inquiries in parallel to bandwidth brokers of the subdomains included in the connection to be initialized in parallel to check for availability of the requested bandwidth.

2. The method of claim 1, wherein the availability or non-availability of the requested bandwidth is notified to the requesting terminal and the connection is initialized or not initialized depending on the notification.

3. The method of claim 1, wherein the requested bandwidth is included in a managed bandwidth scope of the existing connections when the requested bandwidth is available.

4. The method as claimed in claim 3, wherein the connection is initialized to form the connection and the included requested bandwidth is removed from a bandwidth scope of the existing connections after that connection is terminated.

5. The method of claim 1, wherein bandwidth-critical areas of the communication network are checked with regard to the availability of the requested bandwidths in the bandwidth brokers.

6. The method as claimed in claim 5, wherein the bandwidth-critical areas of the communication network are portions of a connection path between the terminals that have a bandwidth scope that is lower than other portions of the connection path.

7. The method of claim 1, wherein non-bandwidth-critical areas in the communication network are represented by areas in which possible bandwidths are at least sufficient for terminals assigned to a respective non-bandwidth critical area so the terminals within that area are available for connection to other terminals in that area.

8. The method of claim 1, wherein the requested bandwidth for the connection to be initialized is determined following evaluation of information contained in a connection initialization packet transmitted by one of the terminals.

9. The method as claimed in claim 8, wherein the communication network is a packet-oriented communication network with SIP protocol and the network agents are SIP proxies and wherein the requested bandwidth is determined from the SIP signaling and SDP-specific signaling information embedded therein.

10. The method as claimed in claim 1 wherein a topology function is implemented in each of the bandwidth brokers and the higher-ranking bandwidth broker via a network model of the communication network, the network model being updated using at least one of the communication network and the bandwidth brokers.

11. The method as claimed in claim 10, wherein the network model is updated at regular intervals, at irregular intervals, as needed, or when changes are made to a network configuration.

12. The method of claim 1, wherein the initialization of a connection is signaling attempting to initialize a logical connection.

13. The method as claimed in claim 12, wherein the terminals are two terminals comprised of a calling terminal and a destination terminal and the associated network agent is a network agent assigned to the destination terminal.

14. The method of claim 1, wherein a network gateway agent is assigned to a network gateway area, and wherein real-time-critical connection signaling that utilizes the network gateway agent is identified, and wherein the associated network agent is the network gateway agent.

15. A communication network comprising:
a plurality of terminals comprising a first terminal and a second terminal;
a plurality of network agents, each network agent configured to manage terminals within a respective non-bandwidth critical area of the network;
a first bandwidth broker configured to communicate with at least one of the network agents; and
a second bandwidth broker, the second bandwidth broker being a higher ranking bandwidth broker than the first bandwidth broker, the network also comprising a plurality of third bandwidth brokers, each bandwidth broker assigned to a respective subdomain of the network; and
wherein when connection signaling takes place to initialize a connection between terminals located in different non-bandwidth critical areas, an associated network agent of the network agents forms a resource request requesting bandwidth, the requested bandwidth is determined by the associated network agent, the resource request being directed to the first bandwidth broker; and
wherein the first bandwidth broker is configured to check an availability of the requested bandwidth in the network using knowledge of bandwidth occupied by existing connections and use of at least one topology function, the first bandwidth broker also configured to transmit a response to the resource request; and
wherein when connection signaling takes place to initialize a connection between terminals located in a same non-bandwidth critical area, an associated network agent permits initialization of the connection to occur without checking for bandwidth availability and without directing any resource request to the first bandwidth broker; and
wherein the first terminal is in a first subdomain and the second terminal is in a second subdomain that is different than the first subdomain; and
wherein the resource request is routed from the first bandwidth broker to the second bandwidth broker to determine subdomains included in the connection to be initialized using a further topology function, and the second bandwidth broker is configured to transmit inquiries in parallel to bandwidth brokers of the subdomains included in the connection to be initialized in parallel to check for availability of the requested bandwidth.

16. The network of claim 15 wherein the first terminal is a calling terminal and the second terminal is a destination terminal and the associated network agent is a network agent assigned to the destination terminal.

17. The network of claim 15 wherein the network is a packet-oriented communication network with SIP protocol and the requested bandwidth is determined from SIP signaling and SDP-specific signaling information embedded therein.

18. The network of claim 15 further comprising a network gateway and wherein a network gateway agent is assigned to a network gateway area, the network gateway agent being a network agent, and wherein the associated network agent is the network gateway agent.

\* \* \* \* \*